United States Patent [19]

Johnson et al.

[11] 4,418,669

[45] Dec. 6, 1983

[54] FUEL DISTRIBUTION CONTROL SYSTEM FOR AN INTERNAL COMBUSTION ENGINE

[75] Inventors: Edwin A. Johnson, Clarkston; Chun K. Leung, Bloomfield Hills, both of Mich.

[73] Assignee: The Bendix Corporation, Southfield, Mich.

[21] Appl. No.: 399,537

[22] Filed: Jul. 19, 1982

[51] Int. Cl.[3] ....................... G06F 15/20; B60K 41/18; F02D 5/00

[52] U.S. Cl. .................................... 123/436; 123/425; 123/480; 123/486; 123/416

[58] Field of Search ............... 123/416, 417, 425, 435, 123/436, 480, 486, 179 L; 364/431.08

[56] References Cited

U.S. PATENT DOCUMENTS

| | | | |
|---|---|---|---|
| 3,596,643 | 8/1971 | Schweitzer | 123/436 |
| 4,044,234 | 8/1977 | Frobenius et al. | 123/436 |
| 4,044,235 | 8/1977 | Frobenius | 123/436 |
| 4,197,767 | 4/1980 | Leung | 74/80 |
| 4,329,960 | 5/1982 | Woodbour et al. | 123/436 |
| 4,357,662 | 11/1982 | Schira et al. | 364/431.08 |

*Primary Examiner*—Raymond A. Nelli
*Attorney, Agent, or Firm*—James R. Ignatowski; Russel C. Wells

[57] ABSTRACT

A fuel distribution control system for equalizing the amplitude of the torque impulses imparted to the crankshaft of an internal combustion engine having a fuel control computer generating fuel quantity signals indicative of the engines fuel requirements, fuel delivery means delivering fuel to the engine in response to the fuel quantity signals and means responsive to the instantaneous rotational velocity of the engine's crankshaft for generating signals indicative of the amplitude and phase angle of the torque impulses imparted to the engine's crankshaft by the individual cylinder. The distribution control including means for correcting the amplitude signal for errors in the phase angle of the torque impulses, means for generating an amplitude error signal indicative of the difference between the corrected amplitude signal and a desired amplitude, means for storing the amplitude error signal generated with respect to each cylinder to generate fuel correction signals and means for summing the fuel correction signals to the fuel quantity signals.

21 Claims, 5 Drawing Figures

FUEL DISTRIBUTION CONTROL SYSTEM FOR AN INTERNAL COMBUSTION ENGINE

CROSS REFERENCE

The invention is related to commonly assigned co-pending patent application Ser. No. 187,400 "Closed Loop Timing and Fuel Distribution Controls" now U.S. Pat. No. 4,357,662 filed Sept. 15, 1980 which is a continuation of patent application Ser. No. 904,131 filed May 8, 1978 now abandoned and patent application Ser. No. 399,538 filed July 19, 1982 "Phase Angle Detector" filed concurrently herewith.

FIELD OF THE INVENTION

The invention is related to the field of internal combustion engine controls and in particular to a circuit for computing the quantity of fuel to be delivered to each cylinder of the engine to equalize the torque contribution of each cylinder to the total torque output of the engine.

Prior Art

Electronic ignition and fuel control systems for internal combustion engines are finding acceptance in automotive and allied industries as a result of substantial increases in fuel costs and pollution standards imposed by the government.

R. W. Randall and J. D. Powell of Stanford University in their research under a Department of Transportation sponsored project determined that for maximum efficiency of an internal combustion engine, the spark timing should be adjusted to provide a maximum cylinder pressure at a predetermined crankshaft angle past the piston's top dead center position. The results of this investigation are published in Final Report No. SUDAAR-503 entitled "Closed Loop Control of Internal Combustion Engine Efficiency and Exhaust Emission." This report contains a block diagram of a closed loop system incorporating a block diagram of a closed loop system incorporating a circuit which detects the angle at which peak pressure occurs then compares this angle with the predetermined angle to generate an error signal. This error signal is then used to correct the ignition timing signal generated in response to other sensed engine parameters as is known in the art.

C. K. Leung and R. W. Seitz in commonly assigned copending patent application, Ser. No. 187,400 filed Sept. 15, 1980 disclose an alternate closed loop engine timing control which computes the phase angle of the torque impulse applied to the engine's output shaft by the individual pistons. The method for calculating the phase angle of the torque impulse disclosed in patent application 187,400 is based on the theory that the phase angle of the torque impulse is indicative of the angle at which maximum pressure occurs in the cylinder. This patent application further discloses a fuel distribution system directed to equalizing the torque contribution of each cylinder to the total torque output of the engine. In the disclosed system, the magnitude of the torque produced by each cylinder is computed and compared with an average torque value to generate a correction signal. The correction signal is then used to correct the quantity of fuel being delivered to the engine. This fuel distribution is based on the assumption that the timing, ignition or fuel injection, is being independently corrected by the timing circuit. As stated in patent application, Ser. No. 187,400 the interaction between independent closed loop controls could be counterproductive or result in overcorrection. Therefore, the individual corrections should be made in accordance with the discussed "state variable theory". The invention is a specific embodiment of a fuel distribution system in which the correction factors for the fuel delivery to the individual cylinders is computed as a function of both the amplitude and phase angle of the resultant torque impulse.

SUMMARY OF THE INVENTION

The invention is a fuel distribution control for equalizing the amplitude of the torque impulses imparted to the crankshaft of an internal combustion engine due to the combustion of fuel in the individual cylinders. The fuel control system includes an electronic fuel control computer generating fuel quantity signals indicative of the engines fuel requirements in response to the operational parameters of the engine, and means for delivering fuel to the engine in response to the fuel quantity signals. A digital period analyzer responsive to the instantaneous rotational velocity of the engine's crankshaft generates signals indicative of the actual amplitude and phase angles of the torque impulses. A difference amplifier generates a phase angle error signal indicative of the difference between the actual phase angle of the torque impulse and a desired phase angle. A first sum amplifier sums the phase angle error signal with the amplitude signal to correct the amplitude signal for the detected phase angle error. A second difference amplifier generates an amplitude error signal indicative of the difference between the corrected amplitude signal and the desired amplitude. An integrator integrates the amplitude error signals to generate fuel correction signals for each engine cylinder. A sum amplifier sums the fuel correction signals with the fuel quantity signal to generate corrected fuel quantity signal which tend to equalize the amplitudes of the torque impulses generated by all of the engines cylinders.

One advantage of the fuel distribution system is that all of the cylinders contribute equally to the total output torque of the engine. Another advantage is that the fuel distribution control automatically compensates for the mechanical differences between the elements of the engine permitting larger manufacturing tolerances on the fuel delivery elements. These and other advantages will become apparent from a reading of the detailed descriptions in conjunction with the figures.

DETAILED DESCRIPTION OF THE INVENTION

Figure 1:
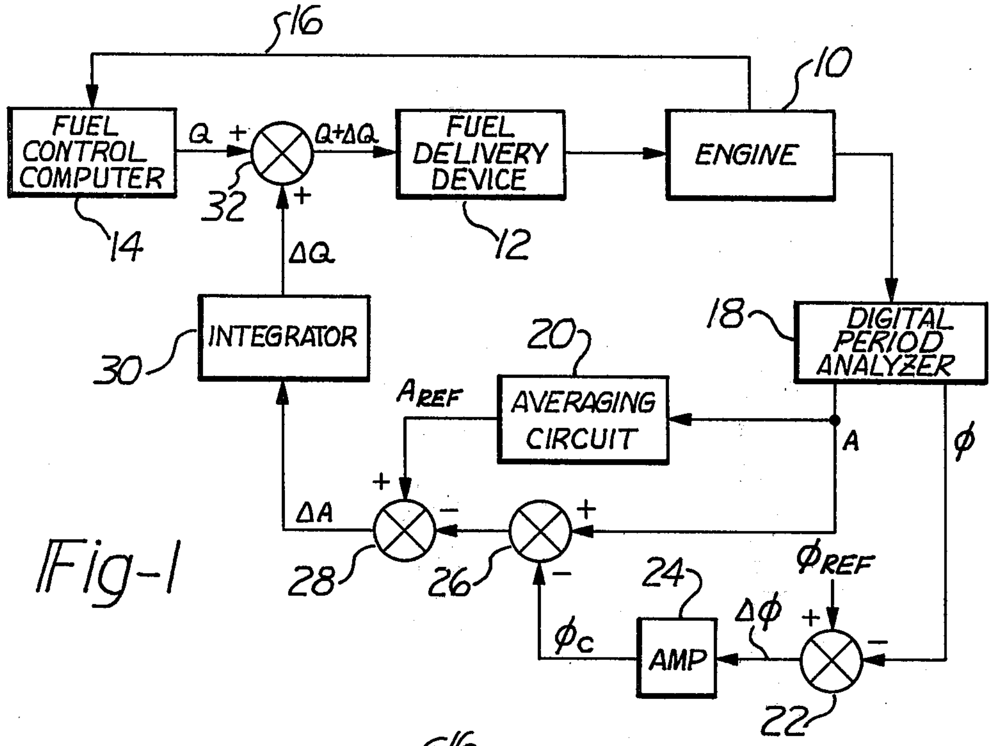
FIG. 1 is a block diagram of a first embodiment of the fuel distribution control.

FIG. 1 is a first embodiment of a fuel distribution system in which the quantity of fuel is corrected for each individual cylinder to equalize the torque input contribution of each cylinder to the total torque output of the engine. Referring to FIG. 1, an internal combustion Engine 10 receives fuel from a Fuel Delivery Device 12 in response to a fuel quantity signal Q generated by a Fuel Control Computer 14. The Engine 10 may be of any type known in the art, compression ignited (diesel) or spark ignited. The Fuel Delivery Device 12 may be multiple fuel injectors, one for each of the engine's cylinders, a single injector (unit injector), one injector for all of the engine's cylinders, a mechanical or electrical actuated carburetor, or any other fuel delivery device known in the art. The Fuel Control Computer 14 may be of any known type which generates electrical, mechanical or fluidic signal Q indicative of the engines fuel requirements in response to the operational parameters of the engine. It is assumed that Engine 10 is equipped with sensors detecting the desired parameters, such as engine temperature, engine speed, intake manifold pressure, intake mass air flow rate and other as in known in the art. Feed back line 16 collectively indicates the communication of these parameters of the Fuel Control Computer 14 from the Engine 10. A Digital Period Analyzer 18 such as disclosed in patent application, Ser. No. 187,400, generates the phase angle signal $\phi$ and the amplitude signal A for each torque impulse in response to detecting the instantaneous rotational velocity of the engine's output shaft or other suitable output member. Preferably, the phase angle signal $\phi$ is corrected for changing engine speed as disclosed in patent application Ser. No. 399,538, filed July 19, 1982, entitled "Phase Angle Detector" which is specifically incorporated herein by reference.

The amplitude signal "A" is computed from the Fourier functions A sin $\phi$ and A cos $\phi$ generated in the computation of the phase angle signal $\phi$ by the Digital Period Analyzer 18 in accordance with the equation:

$$A = \sqrt{(A \sin \phi^2 + (A \cos \phi^2)} \quad (1)$$

where A is the amplitude of the torque impulse. Empirically it has been determined that the amplitude A should be corrected for the difference in engine speed at the beginning and end of each torque impulse similar to the correction to the phase angle $\phi$ as described in patent application Ser. No. 399,537 filed July 1982, now U.S. Pat. No. 4,418,669. Therefore the Digital Period Analyzer 18 outputs a corrected amplitude signal A' have the value:

$$A' = A - kx \quad (2)$$

where A is the amplitude of the torque impulse calculated in accordance with equation (1) and x is the measured difference in engine speed at the beginning and end of each torque impulse.

The amplitude signal A (or A') is averaged in an Averaging Circuit 20 to generate an "average" or "reference" amplitude signal $A_{REF}$ of the torque impulse produced by all of the cylinders. Difference Amplifier 22 generates a phase angle error signal $\Delta\phi$ having a value corresponding to the difference between the computed phase angle signal $\phi$ and a reference phase angle $\phi_{REF}$. The error signal $\Delta\phi$ is amplified in Amplifier 24 to generate a correction signal $\phi_c$ which summed in Sum Amplifier 26 with the amplitude signal A (or corrected amplitude signal A') generated by the Digital Period Amplifier 18. The gain of Amplifier 24 is selected to correct the amplitude signal A for errors caused by variations in injection or ignition timing. The amplified phase angle error signal $\Delta\phi$ when added to amplitude signal A corrects the value of the amplitude signal A to the value it would have had absent any variations in injection or ignition timing. Therefore the output of Sum Amplifier 26 is an amplitude signal $A_c$ whose value is independent of any error in the phase angle of the torque impulse.

Difference Amplifier 28 generates an amplitude error signal $\Delta A$ having a value corresponding to the difference between the desired or reference amplitude $A_{REF}$ generated by Averaging Circuit 20 and the corrected amplitude signal A'. The amplitude error signal $\Delta A$ is integrated in Integrator 30 separately for each cylinder in the engine in a manner corresponding to that described in patent application Ser. No. 178,400 to generate a correction signal $\Delta Q$ for each cylinder. The correction signal $\Delta Q$ is summed in Sum Amplifier 32 with the fuel quantity signal Q being generated by the Fuel Control Computer 14 to generate a corrected fuel quantity signal having a value $Q + \Delta Q$ tending to equalize the amplitude and thereby the torque contribution of each cylinder to the total output of the engine.

Figure 3:
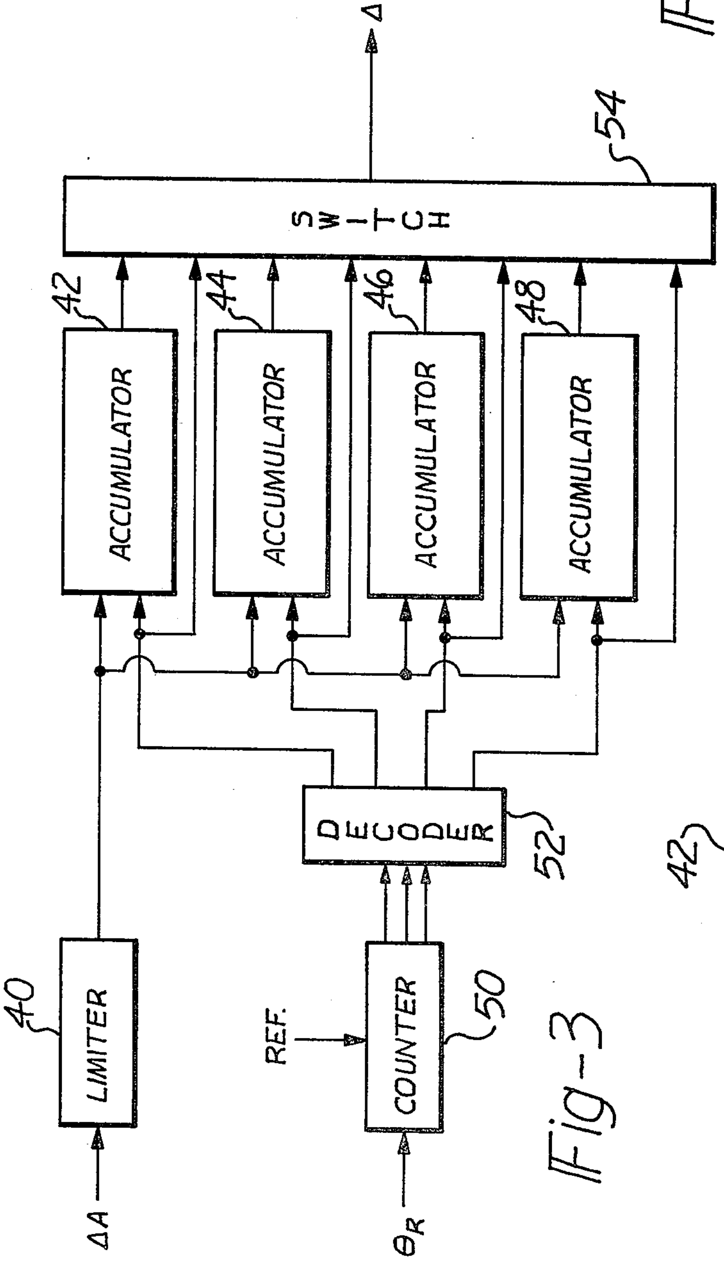
FIG. 3 is a block diagram of the Integrator 30.

As previously indicated the correction signal $\Delta Q$ for each cylinder will have a different value depending on various electrical and mechanical parameters of the engine and fuel delivery devices. For a better understanding of the invention, the details of Integrator 30 will be discussed in detail with reference to FIGS. 3 and 4. Referring first to FIG. 3 the error signal $\Delta A$ from Difference Amplifier 28 is received by a Limiter 40 which limits the absolute value of the error signal $\Delta A$ to a maximum value to prevent start up, an occasional misfire, or similar events from excessively distorting the value of the correction value stored in the accumulator. The limited value of the error signal from Limiter 40 is applied to a plurality of Accumulators 42 through 48. The illustrated circuit is for a four (4) cylinder engine, therefore there are four (4) separate Accumulators, one for each cylinder.

A Counter 50 repetitively receives reference signals $\theta_R$ which are generated at the beginning of each torque impulse being analyzed. The Counter 50 also receives a cylinder reference signal (REF) which is indicative of the beginning of the torque impulse for a predetermined one of the four cylinders. The reference signal (REF) resets the counter at the beginning of each engine cycle. The counter then counts the reference signals $\theta_R$ and generates a number indicative of the cylinder whose torque impulse is being analyzed. The number current in the Counter 50 is received by a Decoder 52 which generates a signal enabling the Accumulator 42 through 48 corresponding to the number in Counter 50 to receive and store the limited error signal $\Delta A$ output from the Limiter 40. The Accumulators 42 through 48 are thus activated one at a time in a predetermined sequence to receive and store the error signal $\Delta A$ computed from the torque impulse generated by its corresponding cylinder.

The accumulated error signals $\Delta A$ stored in the Accumulators 42 through 48 are the correction signals $\Delta Q$ used to correct the fuel quantity being delivered to the engine.

The number stored in the Counter 50 is also received by an electronic Switch 54 which transmits the correction signals $\Delta Q$ stored in Accumulator 42 through 48 to the Sum Amplifier 32 where it is added to the fuel quantity signal Q generated by the Fuel Control Computer 14. The sequence which the Switch 54 connects the individual Accumulators to the Sum Amplifier 32 is selected so that the correction signal ΔQ transmitted to Sum Amplifier 32 is from the Accumulator corresponding to the cylinder into which the corrected fuel quantity Q+ΔQ will be delivered.

Figure 4:
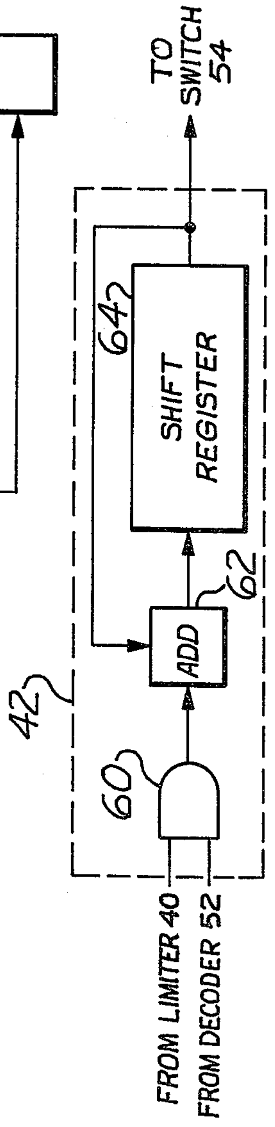
FIG. 4 is a circuit diagram of the individual accumulators in the Integrator 30.

The details of the Accumulators 42 to 48 are shown in FIG. 4. Since all of the accumulators are identical only Accumulator 42 will be explained in detail. Referring to FIG. 4, the output from Limiter 40 and one of the outputs from Decoder 52 are received at alternate inputs to AND Gate 60. The output of AND Gate 60 is connected to one input of Adder 62 having its output connected to the input of a Shift Register 64. The output of Shift Register 64 is connected to Switch 54 and to an alternate input to Adder 62.

Figure 5:
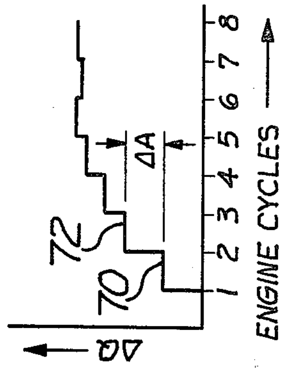
FIG. 5 is a graph depicting the operation of the Integrator 30.

In operation, an amplitude error signal ΔA is generated for each cylinder in the same sequential order as the cylinders themselves impart a torque impulse to the engine's crankshaft. In a corresponding sequential order, Decoder 52 generates signals enabling the AND Gates 62 in the associated accumulator. Therefore each time an error signal ΔA is generated for a particular cylinder, only the AND gate in the associated accumulator is enabled. The enabled AND gate 62 passes the error signal to the Adder 62 where it is added to the content of the Shift Register 64 then the sum is again stored in the Shift Register 64. At the end of the first engine cycle, the sum stored in the associated Shift Register 64 of each accumulator is the value of the error signal A for that particular cylinder as indicated by step 70 in FIG. 5. During the first engine cycle the value of the error signal ΔA will be large, therefore the value of the signal stored in the Shift Register 64 will be the maximum value allowed by Limiter 40. During the next engine cycle, the content of the Shift Register 64 will be summed with the signal generated by the Fuel Control Computer 14 to change the quantity of fuel delivered to that particular cylinder. The change in the quantity of delivered fuel will tend to change the amplitude of the torque impulse generated by that cylinder in a direction towards the value of the desired amplitude generated by Integrator 20 of FIG. 1 or Look up Table of FIG. 2. As a result, the magnitude of the error signal ΔA during the second engine cycle may be smaller. The error signal generated during the second engine cycle will again be added to the Shift Register 64 in the associated accumulator and the Shift Register 64 will now store the sum of the two error signals as indicated by step 72 of FIG. 5. During the next few cycles, the Shift Registers 64 in each accumulator will store the sum of the previous error signals for its associated cylinders until the stored correction signal ΔQ when added to the fuel quantity signal Q produces a torque impulse having an amplitude approximately equal to the desired amplitude.

When this happens the amplitude error signal approaches zero and the correction signal Δφ will have a constant value within a given engine speed range.

As is known, the amplitude of the torque impulse will change with engine speed. Therefore as engine speed changes, the value of the amplitude signal $A_{REF}$ from Averaging Circuit 20 will change and the correction signal ΔQ stored in the individual Accumulator 42 through 48 may no longer have the desired value. As a result, amplitude error signal ΔA will be generated correcting the values of the individual correction signal Q stored in the Accumulators 42 through 48 to compensate for changes in engine speed.

One advantage of the disclosed fuel distribution control is that the contributions of the individual cylinders to the total torque output of the engine are equalized producing smoother and more efficient operation of the engine. Another advantage of the fuel distribution control is that it automatically compensates for differences in the mechanical tolerances of the engines individual elements eliminating many critical tolerances on these elements.

Figure 2:
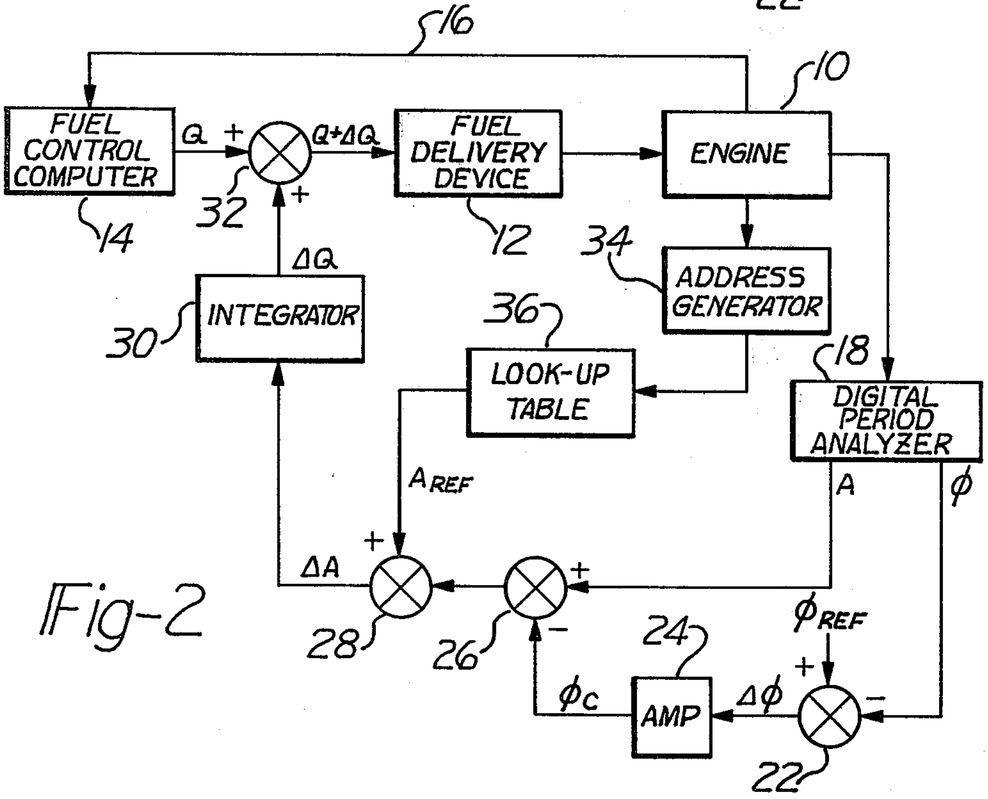
FIG. 2 is a block diagram of an alternate embodiment of the fuel distribution control.

An alternate embodiment of the fuel distribution system is illustrated in FIG. 2.

Referring to FIG. 2, the circuit is the same as shown in FIG. 1 except that the Averaging Circuit 20 is replaced by an Address Generator 34 and a Look-Up Table 36. As previously discussed, the amplitude of the torque impulse changes as a function of operational state of the engine. For any given operational state of the engine, the desired amplitude of the torque impulse as a function of one or more operational parameters of the engine can be determined. The desired amplitudes of the torque impulse signal may therefore be stored in a Look-Up Table 36 such as a Random Access Memory (ROM) as a function of the selected operational parameter. The Look-Up Table 36 may therefore be addressed by a digital signal corresponding to the selected operational parameter of the engine to output the desired amplitude of the torque impulse as the amplitude reference signal $A_{REF}$ to Difference Amplifier 28. In the preferred embodiment the selected operational parameter of the engine is the engine speed, however, other parameters such as driver input (throttle position), intake manifold pressure, or fuel demand may be used instead of engine speed.

The Address Generator 34 may be any known type capable of converting the selected operational parameter of the engine into a digital number. In the preferred embodiment, the Address Generator 34 is a counter such as the variable speed counter circuit described in patent application Ser. No. 187,400 for converting the rotational speed of the engine into a digital number. This type circuit reduces the required address range of the look-up table to a reasonable number, particularly at low engine speeds.

The operation of the alternate embodiment is as follows: As previously described, the Digital Period Analyzer 18 generates in response to the instantaneous rotational velocity of the engines crankshaft a phase signal φ and amplitude signal A. A phase angle error signal Δφ is generated by Difference Amplifier 22 having a value equal to the difference between the computed phase angle φ and a reference phase angle $\phi_{REF}$. The phase angle error signal Δφ is amplified in Amplifier 24 to generate a phase angle correction signal $\phi_c$. The phase angle correction signal $\phi_c$ is summed with the amplitude signal A in Sum Amplifier 26 to generate a corrected amplitude signal $A_c$ corrected for the phase angle error Δφ.

A digital address corresponding to the rotational speed of the engine is generated by Address Generator 34 in response to a rotational member of the Engine 10 such as the engine's crankshaft. The digital address is converted to a reference amplitude $A_{REF}$ corresponding to the desired amplitude of the torque impulse by means of Look-Up Table 36.

Difference Amplifier 28 generates an amplitude error signal ΔA having a value equal to the difference between the corrected amplitude signal $A_c$ and the reference signal $A_{REF}$output from the Look-Up Table 36 for each torque impulse. The amplitude error signals $\Delta A$ are integrated in Integrator 30 as previously described to generate a correction signal $\Delta\phi$ for each engine cylinder. The correction signal $\Delta\phi$ is summed with the fuel quantity signal Q generated by the Fuel Control Computer 14 in Sum Amplifier 32 to generate a fuel quantity signal $Q+\Delta Q$ for each cylinder individually correcting the delivered fuel quantity for difference between the computed amplitude of the torque impulse and the desire or reference amplitude $A_{REF}$ of the torque impulse at the the given engine speed.

It is not intended that the invention be limited to the embodiments shown in the appended drawings and discussed in the Specification. It is recognized that the functions of the hardwired circuits shown may alternatively be performed by a programmed microprocessor or computer. It is further recognized that those skilled in the art may conceive other ways for performing these same functions without departing from the spirit of the invention as described herein and set forth in the appended claims.

What is claimed is:

1. A fuel distribution control for an internal combustion engine comprising:

means for computing the phase angle and amplitude signals indicative of the torque impulses applied to a rotary member of the engine by the combustion process in each engine cylinder;

first difference means for comparing said computed phase angle signal with a reference phase angle to generate a phase angle correction signal;

first sum means for summing said computed amplitude signal with said phase angle correction signal to generate a corrected amplitude signal;

second difference means for comparing said corrected amplitude signal with a reference amplitude signal to generate an amplitude error signal;

integrator means for integrating said amplitude error signals to generate a fuel quantity correction signal for each engine cylinder;

fuel control computer means for generating a fuel quantity signal for each engine cylinder in response to detected engine parameters; and second sum means for summing said fuel quantity signals with said fuel quantity correction signals to change the quantity of fuel delivered to the engine tending to equalize the amplitude of the torque impulses generated by the individual engine cylinder.

2. The fuel distribution control of claim 1 wherein said means for computing the phase angle and amplitude of the torque impulses is a digital period analyzer response to the instantaneous rotational velocity of the engine's crankshaft.

3. The fuel distribution control of claims 1 or 2 wherein said second difference means further includes:

averaging means for averaging the computed amplitude signals to generate said reference amplitude signals having a value corresponding to the average value of said computed amplitude signals; and a difference amplifier for generating said amplitude error signal having a value corresponding to the difference between said corrected amplitude signal and said amplitude reference signal generated by said integrator means.

4. The fuel distribution control of claims 1 or 2 wherein said second comparator means further includes:

look-up table means for storing in discrete memory locations reference amplitude signals as a function of an operational parameter of the engine;

address generator means responsive to said operational parameter of the engine for generating an address signal activating said look-up table to output a reference amplitude signal corresponding to the operational state of the engine; and a difference amplifier for generating said amplitude error signal having a value corresponding to the difference between said corrected amplitude signal and said reference signal output from said look-up table means.

5. The fuel distributor control of claim 4 wherein said operational parameter of the engine is engine speed, said address generator means is responsive to the rotational speed of the engine's crankshaft.

6. The fuel distribution control of claim 1 wherein said integrator means comprises:

decoder means responsive to the rotational position of the engines crankshaft for generating a repetitive set of sequential signals, one signal for each engine cylinder during each engine cycle;

a plurality of accumulator means, one associated with each cylinder, each accumulator means responsive to one of said sequential signals to store the amplitude error signal corresponding to its associated cylinder to generate said fuel quantity correction signals; and switch means responsive to said sequential signals for outputting to said second sum amplifier means, the fuel quantity correction signal corresponding to the engine cylinder for which the fuel quantity is currently being computed.

7. The fuel distribution control of claim 3 wherein said integrator means comprises:

decoder means responsive to the rotational position of the engines crankshaft for generating a repetitive set of sequential signals, one signal for each engine cylinder during each engine cycle;

a plurality of accumulator means, one associated with each cylinder, each accumulator means responsive to one of said sequential signals to store the amplitude error signal corresponding to its associated cylinder to generate said fuel quantity correction signals; and switch means responsive to said sequential signals for outputing to said second sum amplifier means, the fuel quantity correction signal corresponding to the engine cylinder for which the fuel quantity is currently being computed.

8. The fuel distributor control of claim 4 wherein said integrator means comprises:

decoder means responsive to the rotational position of the engines crankshaft for generating a repetitive set of sequential signals, one signal for each engine cylinder during each engine cycle;

a plurality of accumulator means, one associated with each cylinder, each accumulator means responsive to one of said sequential signals to store the amplitude error signal corresponding to its associated cylinder to generate said fuel quantity correction signals; and switch means responsive to said sequential signals for outputing to said second sum amplifier means, the fuel quantity correction signal corresponding to the engine cylinder for which the fuel quantity is currently being computed.

9. In a fuel control system for an internal combustion engine having an electronic fuel control computer generating fuel quantity signals indicative of the engines fuel requirements in response to the operational parameters of the engine, at least one fuel delivery means for delivering fuel to the engine in response to the fuel quantity signals, and means for computing the phase angle and amplitude of the torque impulses imparted to the engines crankshaft by the burning of the fuel in the engine, an improved fuel distribution control for equalizing the amplitudes of the torque impulses characterized by:

first difference means for generating a phase angle error signal having a value corresponding to the difference between the computed phase angle and a reference phase angle;

first sum amplifier means for summing said phase angle error signal with the computed amplitude signal to generate a phase angle corrected amplitude signal;

means for generating an amplitude reference signal having a value variable as a function of the operational state of the engine;

second difference means for generating an amplitude error signal having a value indicative of the difference between said reference signal and said corrected amplitude signal;

integrator means for integrating said amplitude error signals to generate a fuel quantity correction signal for each engine cylinder; and second sum amplifier means for summing said fuel quantity correction signals with the fuel quantity signals generated by the fuel control computer to correct the quantity of fuel being delivered to each engine cylinder tending to equalize the amplitudes of the torque impulses generated by the individual engine cylinders.

10. The fuel distribution control of claim 9 wherein said means for generating an amplitude reference signal comprises means for averaging the computed amplitude signals to generate said reference signal having a value corresponding to the average computed amplitude signal.

11. The fuel distribution control of claim 9 wherein said means for generating an amplitude reference signal comprises:

look-up table means for storing in discrete memory locations reference amplitude signals as a function of an operational parameter of the engine; and address generator means responsive to said operational parameter of the engine for generating an address signal enabling said look-up table to output said reference amplitude signal having a value variable as a function of said operational parameter.

12. The fuel distributor control of claim 11 wherein said operational parameter of the engine is the engine speed.

13. The fuel distributor control of claims 10 or 11 wherein said integrator means comprises:

decoder means responsive to the rotational position of the engines crankshaft for generating a repetitive set of sequential signals, each signal being indicative of the piston of an associated cylinder being in a predetermined position;

a plurality of accumulator means, one associated with each cylinder, each accumulator means responsive to one of said sequential signals to store the amplitude error signal corresponding to its associated cylinder to generate said fuel quantity correction signals; and switch means responsive to said sequential signals for outputting to said second sum amplifier means, the fuel quantity correction signal corresponding to the engine cylinder for which the fuel quantity is currently being computed.

14. An improvement for a fuel control system for an internal combustion engine having an electronic fuel control computer generating fuel quantity signals indicative of the engine's fuel requirements and fuel delivery means for delivering fuel to the engine in response to the fuel quantity signals, comprising:

means responsive to the rotational velocity of the engines crankshaft for generating actual phase angle and amplitude signals indicative of the phase angle and amplitude of the torque impulses imparted to the engine's crankshaft by the burning of the fuel in the engine's cylinders;

first difference means for generating an amplitude correction signal having a value corresponding to the difference between the actual phase angle signal and a reference phase angle signal;

means for generating an amplitude reference signal having a value variable as a function of an operational parameter of the engine;

second difference means for generating an amplitude error signal having a value indicative of the difference between said corrected amplitude signal and said amplitude reference signal;

integrator means for integrating said amplitude error signals to generate a fuel quantity correction signal for the each engine cylinder; and second means for summing said fuel quantity correction signals with the fuel quantity signals generated by the electronic fuel control computer to generate a corrected fuel quantity signal for each engine cylinder, said corrected fuel quantity signals tending to equalize the amplitudes of the torque inputs generated by the individual engine cylinders.

15. The improvement of claim 14 wherein said means for generating an amplitude reference signal includes means for averaging the actual amplitude signal to generate said amplitude reference signal having a value corresponding to the average of sequentially generated actual amplitude signals.

16. The improvement of claim 14 wherein said means for generating an amplitude reference signal comprises:

look-up table means for storing in discrete memory locations a plurality of amplitude reference signals in a sequential order as a function of engine speed; and address generator means, responsive to the rotational speed of the engine for generating addresses enabling said look-up table means to output the amplitude reference signal corresponding to the engine speed.

17. A method for equalizing the amplitudes of the torque impulse imparted to the crankshaft of an internal combustion engine having a fuel control computer generating fuel quantity signals indicative of the fuel requirement for each engine cylinder and means for supplying fuel to the engine in response to said fuel quantity signals, said method comprising the steps of:

detecting the changes in the instantaneous rotational velocity of the engines crankshaft to generate actual amplitude and phase angle signals indicative of the actual amplitude and phase angle of the torque impulses imparted to the engines crankshaft by the burning of fuel in the engine's individual cylinder;

amplifying the difference between the actual phase angle signal and a reference phase angle signal to generate an amplitude correction signal;

summing said amplitude correction signal with said actual amplitude signal to generate a corrected amplitude signal;

generating a reference amplitude signal having a value variable as a function of an operational parameter of the engine;

amplifying the difference between said actual amplitude signal and said reference amplitude signal to generate an amplitude error signal;

individually integrating said amplitude error signals for each cylinder to generate a plurality of fuel quantity correction signals, one fuel quantity correction signal for each cylinder; and adding said fuel quantity correction signals, one at a time in a predetermined sequence to the fuel quantity signals generated by the electronic fuel control computer, to correct the quantity of fuel delivered to each engine cylinder tending to equalize the amplitudes of the torque impulse of all the engine cylinders.

18. The method of claim 17 wherein said step of generating a reference amplitude signal comprises the step of averaging said actual amplitude signals to generate a reference signal having a value corresponding to the average value of said actual amplitude signals.

19. The method of claim 17 wherein said step of generating a reference amplitude signal comprises the steps of:

detecting at least one operational parameter of the engine to generate an address signal corresponding to the value of said operational parameter;

addressing a storage array with said address signal to output said reference amplitude signal, said storage array storing said reference amplitude signal in addressable storage locations as a function the value of said operational parameter of the engine.

20. The method of claim 19 wherein said step of detecting at least one operational parameter of the engine detects the engine's rotational speed and said storage array stores said reference amplitude signals as a function of engine speed.

21. The method of claim 15 or 16 wherein said step of individually integrating said amplitude error signals comprises the steps of:

detecting the movement of at least one engine member to generate a set of repetitive signals for each engine cycle; each set of signals comprising a separate signal associated with each engine cylinder and indicative of the piston in the associated cylinder having a predetermined position;

enabling one at a time and in a predetermined sequence a corresponding set of accumulators to store said amplitude error signals and generate said fuel quantity correction signals, each accumulator storing the error correction signals generated by an activated cylinder; and enabling one at a time and in a second predetermined sequence said accumulators to output the stored fuel quantity correction signals in a timed sequence with the generation of the fuel quantity signal for the associated cylinder.

* * * * *